United States Patent [19]

Fouts

[11] 4,397,452
[45] Aug. 9, 1983

[54] HYDRO-MECHANICAL STOP FOR A SHOCK ABSORBER

[75] Inventor: Norman G. Fouts, Middletown, Ohio

[73] Assignee: Ford Motor Company, Dearborn, Mich.

[21] Appl. No.: 211,485

[22] Filed: Nov. 28, 1980

[51] Int. Cl.³ .............. B60G 13/00; B60G 15/00; F16F 9/48

[52] U.S. Cl. .................. 267/8 R; 188/284; 188/315; 188/322.11

[58] Field of Search ......... 188/322.22, 322.11–322.21, 188/280–282, 300, 284–289, 314–320; 267/8 R, 35, 64.15, 64.26, 120, 124, 64.12, 140, 139, 116; 280/702, 708

[56] References Cited

U.S. PATENT DOCUMENTS

| 2,606,630 | 8/1952 | Rossman | 188/284 |
| 2,944,639 | 7/1960 | Blake | 188/287 X |
| 4,036,319 | 7/1977 | Andre | 188/282 |
| 4,312,499 | 1/1982 | Wössner et al. | 267/8 R |
| 4,328,960 | 5/1982 | Handke et al. | 267/8 R |

FOREIGN PATENT DOCUMENTS 668926 3/1952 United Kingdom .............. 188/284

Primary Examiner—Douglas C. Butler
Attorney, Agent, or Firm—Roger L. May; Keith L. Zerschling

[57] ABSTRACT

A hydro-mechanical compression and rebound stop 22 for a suspension strut 10 in which a tubular sleeve 30 is coaxially mounted about a piston rod 18 and is positioned by a coil spring 26 which has its other end seated against a fixed annular seat 24. An abutment ring 50 engages the bottom end of the sleeve 30 to force the sleeve through the annular seat 24 against the bias of the spring and to cause a hydraulic restricted hydraulic flow therethrough. Upon rebound, the abutment ring 50 compresses an elastomeric sleeve 48 against a rod guide 43 at the top end of the working cylinder 12.

20 Claims, 5 Drawing Figures

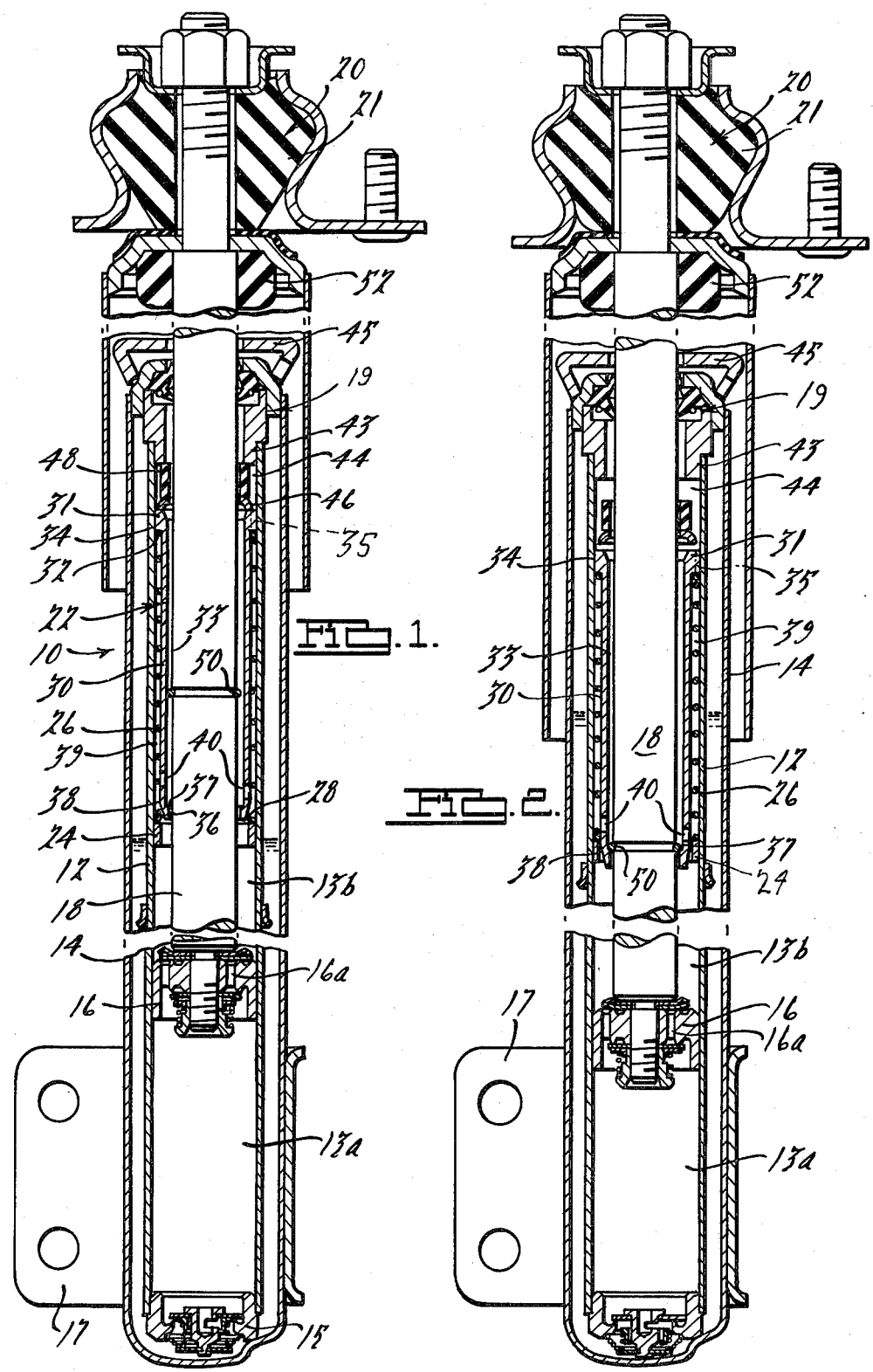

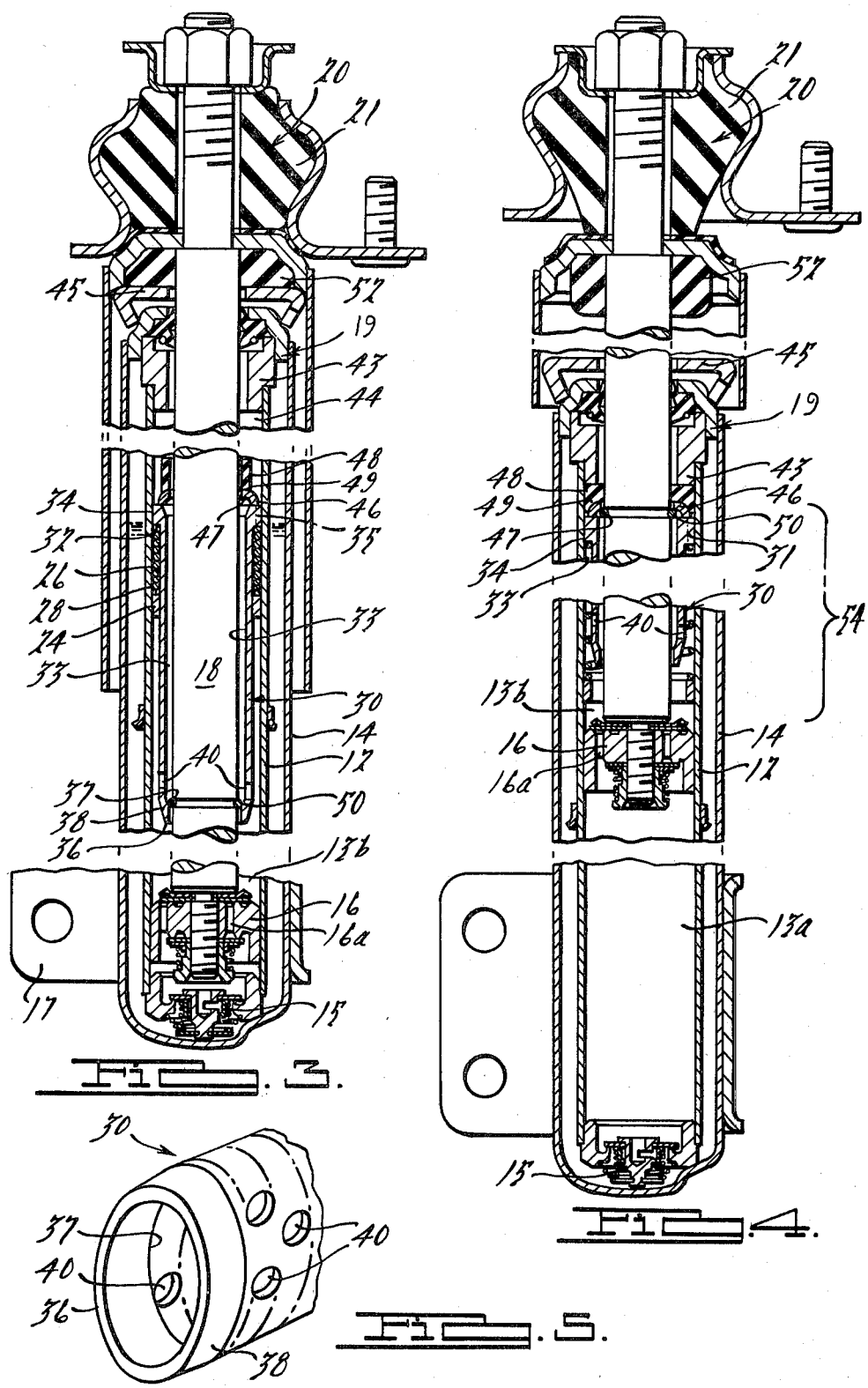

HYDRO-MECHANICAL STOP FOR A SHOCK ABSORBER

BACKGROUND OF THE INVENTION

Field of the Invention

This invention relates to compression and rebound stops for a shock absorber and more particularly to a suspension strut which uses the internal hydraulics to assist in the compression stop.

Disclosure Information

Suspension struts are similar to shock absorbers in the fact that they are designed to dampen shocks. Often struts are designed such that the dampening rate of the strut becomes higher at the two extremes of the piston stroke namely the rebound and compression ends. A variety of mechanisms have been devised to render a higher dampening rate at the extremes of the piston stroke. Springs and elastomeric jounce bumpers have been used internally and externally of the working cylinder. In addition, secondary pistons have been used which become operative only at the extreme ends of the piston stroke.

All previous designs, however, have added length to the shock or strut while maintaining the desired length of the stroke of the piston or, vice versa, have shortened the stroke of the piston while maintaining the desired length strut.

Most suspension struts are designed with a "dead length" incorporated in the piston rod to assure structural integrity of the strut. The "dead length" is a minimum amount of piston rod needed to intrude into the working cylinder to assure the strut is not bent due to side loads exerted thereon. It is desired to design a hydraulic mechanical stop to increase the dampening rate at the compression end of the piston stroke while utilizing the "dead length" without increasing the length of the strut or shortening the piston stroke.

SUMMARY OF THE DISCLOSURE

In accordance with the invention, a shock absorber has a working cylinder with a piston slideably received therein attached to a piston rod which extends from an open end of the cylinder. The open end has a closure slideably receiving the piston rod. A hydro-mechanical stop is coaxially mounted about the piston rod between the piston and closure. The hydro-mechanical stop includes an abutment fixed to the piston rod spaced from the piston. Coaxially mounted about the piston rod is a sleeve having a length no greater than the distance between the abutment and the piston. The top of the sleeve defines the bottom of a variable size chamber between the sleeve and closure into which hydraulic fluid flows during a compression stroke. The sleeve has a seat at its lower end which engages the abutment on the piston rod when the piston rod has moved a predetermined distance in its compression stroke. A spring is seated between a spring seat on the sleeve and a seat fixed to the working cylinder to bias the sleeve upwardly. The abutment engages the sleeve such that it moves the sleeve downward against the bias of the spring and enlarges the variable size chamber during a compression stroke. An elastomeric bumper is seated above the sleeve within the variable size chamber and engageable with the abutment on the piston rod when the piston rod is in its full rebound position such that the elastomeric bumper is compressible between the abutment and the closure of the working cylinder.

Preferably, the upper end of the sleeve slidably engages the inner wall of the working cylinder and restricts hydraulic flow therebetween. The bottom end of the sleeve is sized to extend through the spring seat fixed to the working cylinder during a compression stroke such that it restricts hydraulic flow between the sleeve and seat. Apertures are placed in the sleeve to provide a restricted hydraulic flow path from the rebound chamber below the sleeve to the variable size chamber during a compression stroke that exceeds a predetermined minimum displacement.

Preferably, an external jounce bumper is mounted about the piston rod fixed to the mounting assembly which is compressible between the upper closure of the working cylinder and the mounting assembly when the strut is in its full compression position.

In broader terms, a hydraulic shock absorber includes a piston silideably mounted in a working cylinder with a fluid flow control device mounted within the working cylinder and defining in part a compression stop chamber above the piston. The fluid flow control device is actuable to allow restricted flow of hydraulic fluid therethrough. A response system actuates the fluid flow device only after the piston has moved a predetermined amount in its compression stroke. The fluid flow control device is preferably constructed to increase the size of the compression stop chamber and provides restricted flow of hydraulic fluid through the flow control system from the rebound chamber to the compression stop chamber during the compression stroke.

BRIEF DESCRIPTION OF THE DRAWINGS

Reference now will be made to the accompanying drawings in which:

FIG. 1 is a fragmented side elevational and partially segmented view of a suspension strut having a shock absorber constructed in accordance with the invention, the components of the shock absorber being shown in a neutral position.

FIG. 2 is a view similar to FIG. 1 except that the shock absorber is shown in partial compression.

FIG. 3 is a view similar to FIG. 1 except that the shock absorber is shown in full compression.

FIG. 4 is a view similar to FIG. 1 except that the shock absorber is shown in full rebound.

FIG. 5 is an enlarged fragmentary view of the tapered portion of the sleeve shown in FIG. 1.

DETAILED DESCRIPTION OF THE PREFERRED EMBODIMENT

Referring to FIG. 1, a suspension strut 10 incorporating a shock absorber has a working cylinder 12, outer cylinder 14, base valve 15, piston 16, piston rod 18, wheel mount bracket 17, a closure assembly 19 and a mounting assembly 20 of conventional nature. The piston 16 divides the cylinder 12 into a main jounce or compression chamber 13a and rebound chamber 13b and has a valve system 16a incorporated therein which provides for a restrictive flow of hydraulic fluid therethrough to create a dampening force. In addition, a hydro-mechanical stop assembly 22 is mounted within the working cylinder 12 about the piston rod 18.

The hydro-mechanical stop assembly 22 includes an annular spring seat 24 fixed to the working cylinder 12 and positioned above the piston 16. A coil spring 26 has its lower end seated against the shoulder 28 of the spring seat 24. Coaxially mounted within the coil spring and about the piston rod is a sleeve 30. The sleeve 30 has an annular top end 31 which forms an upper shoulder 32 which seats the upper end of coil spring 26. The top end 31 has an outer peripheral cylindrical wall 34 which is sized to form a restricted flow path between it and the working cylinder 12. An optional vertical slot 35 can be notched in wall 34. The sleeve 30 has a central opening 33 which is larger than the diameter of piston rod 18. Bottom end 36 of sleeve 30 as shown in enlarged detail in FIG. 5, forms an annular ledge 37 about central opening 33. The bottom end 36 has a tapered outer surface 38 and has passageways 40 extending therethrough in the proximity of tapered section 38. The passages 40 are vertically displaced from one another.

The top end 31 of sleeve 30, a rod guide 43 of the closure assembly 19, and the working cylinder 12 form a variable size compression stop chamber 44 therebetween.

Seated on the top end 31 of the sleeve 30 within chamber 44 is an annular ring 46 which has its upper surface seating an elastomeric tubular bumper 48 which is engageable with the rod guide 43 of closure assembly 19.

The undersurface of annular ring 46 is engageable with an abutment ring 50 which is fixed onto the piston rod 18 when the piston rod is in a full rebound position. The abutment ring 50 is sized to fit within the central opening of the tubular sleeve 30 with a clearance for allowing fluid to pass therebetween. The abutment ring 50 is engageable with the ledge 37 at the bottom end 36 of sleeve 30 when the piston rod 18 is displaced in a compression stroke by an amount that exceeds a predetermined minimum.

The abutment ring 50 is positioned above the piston by a distance which is greater than the length of the tubular sleeve 30. In addition, the sleeve 30 has an axial dimension which is over one-half the length of the total piston stroke and preferably, in approximation, two-thirds the length of the piston stroke.

External of the working cylinder is an external jounce bumper 52 which is fixed below the mounting assembly 20 and is engageable with the top cap 45 of end closure assembly 19. The mounting assembly includes an elastomeric mounting ring 21.

OPERATION

The operation of the device can be seen more clearly by referring to FIGS. 1 through 4. As shown in FIG. 1 when the piston moves in the normal mid range, the abutment ring 50 slides within the central opening 33 of the sleeve 30 with a clearance therebetween and the hydro-mechanical assembly remains unchanged. During a compression stroke in this mid range, fluid flows from the jounce chamber 13a, through the piston valving 16a and into the rebound chamber 13b. In addition, some fluid exits the jounce chamber 13a via the base valve 15. The rebound chamber 13b is in communication with the annular space between the sleeve 30 and piston rod 18 and the annular chamber 39 between the sleeve 30 and the cylinder 12. The compression stop chamber 44, in turn, is in communication with the annular space between sleeve 30 and rod 18.

However, as shown in FIG. 2 when the piston 16 approaches the bottom of the working cylinder 12 and a compression stop is needed, the abutment ring 50 engages the annular ledge 37 of the sleeve 30 and starts to force the sleeve 30 downward following the movement of the abutment ring 50. Simultaneously, the ring 50 in conjunction with ledge 37 cuts off hydraulic flow through the central opening 33 at bottom 36. The sleeve 30 moves downwardly against the upward bias of coil spring 26. The tapered end 38 of sleeve 30 passes through the annular seating ring 24 to gradually shut off hydraulic flow into the coil spring chamber 39 formed by the working cylinder 12, spring seat 24, and sleeve 30. In addition, the vertically displaced passages 40 pass through seat 24 in sequence to provide progressively restricted fluid flow paths between chamber 39 and central opening 33 leading to chamber 44.

Simultaneously, the compression stop chamber 44 increases in size due to the lowering of the top end 31 of sleeve 30. Hydraulic fluid within the rebound chamber 13b of working cylinder 12 flows through the restrictive passages 40 in the sleeve 30 once they pass below seat 24 and through central opening 33 between the piston rod 18 and sleeve 30. Also a restrictive flow of fluid occurs out of chamber 39 into the compression stop chamber 44 by flowing through slot 35 or by leakage about wall 34. In addition, fluid may flow to rebound chamber 13b by leakage about seat 24.

The hydro-mechanical stop assembly 22 continues to work until, as shown in FIG. 3, the spring 26 becomes totally compressed between the top seat 32 and the seat 28 on the spring seat 24. At this point in time, the coil spring 26 between sleeve seat 32 and spring seat 24 creates a rigid stop for the strut 10 just before the piston 16 would otherwise bottom out onto the base valve 15. As the sleeve 30 approaches its full compression stroke position, the external jounce bumper 52 and the mounting ring 21 also assist as a compression stop for the strut 10.

As shown in FIG. 2, the coil spring 26 and spring seat 24 allows the sleeve 30 to travel over one-half of its axial length and more preferably lets the sleeve 30 travel approximately three-quarters of its axial length before being rigidly stopped.

Thus, as shown in FIGS. 2 and 3 and described above, during the time the sleeve 30 is being pulled down by abutment ring 50 further dampening occurs by the restricted flow of fluid from rebound chamber 13b through flow control ports 40 to the chamber 44 in addition to the regular dampening caused by the piston 16. The extra dampening acts as a compression stop to alleviate or minimize the bottoming out of the strut.

As shown in FIG. 4, the hydro-mechanical stop assembly 22 also incorporates a rebound stop mechanism. During a rebound stroke, the piston rod 18 and abutment ring 50 move upwardly through central opening 33 in sleeve 30. At the end of the rebound stroke, abutment ring 50 abuts the undersurface 47 of the annular ring 46 which in turn presses against elastomeric bumper 48 which is then compressed between the annular ring 46 and the rod guide 43 of end closure assembly 42. The compression of the elastomeric bumper 48 acts as a rebound stop.

The advantages of the hydro-mechanical stop assembly 22 are multiple. Firstly, a compression stop is built internally to the working cylinder and free from corrosion and the adverse conditions often encountered exterior of the strut body 14. Secondly, the internal compression stop as shown in FIG. 4, is built about the "dead length" (indicated at 54 in FIG. 4) of the piston rod which must be designed in struts to maintain the structural integrity of the strut. In this way, no added length is added to the strut and conversely the piston stroke is not shortened while the full advantages of the compression stop are built into the strut. Thirdly, the abutment ring 50 has two functions; firstly as an actuator for the compression stop and secondly as an actuator for the rebound stop which also is built within the dead length 54 of the strut. Fourthly, the incorporation of an efficient compression stop internally to the strut body allows for softer rubber to be incorporated in the external jounce bumper 52 and the elastomeric mounting ring 21 than previously was practical to use. The use of the softer rubbers for the mounting ring 21 allows for better insulation of vibrations when the piston is operating in the mid-range of the working cylinder with relatively short compression and rebound strokes as shown in FIG. 1. The use of a softer jounce bumper 52 allows for gradual and smoother bottoming out of the strut.

The incorporation of the compression stop within the dead length 54 of the strut is of significant value due to packaging constraints and the desire of incorporating lower more aerodynamically efficient profiles in motor vehicles. The use of the internal compression stop eliminates the need of a bulky and extremely tall external jounce bumper which has been extensively used to adequately arrest the body of the strut at the end of the compression stroke.

Variations and modifications of the present invention are possible without departing from the spirit and scope as defined in the appended claims.

The embodiments in which an exclusive property or privilege is claimed are defined as follows:

1. A hydraulic shock absorber characterized by:
   a working cylinder;
   a piston rod and a piston mounted thereon sized to be slideably received within said working cylinder and dividing said cylinder into jounce and rebound chambers;
   an end closure closng one end of said working cylinder and having an opening to slideably receive said piston rod;
   said piston having flow control means constructed to provide a restrictive fluid passage for the controlled flow of hydraulic fluid from one of said chambers to the other of said chambers when said piston is moved in said working cylinder to thereby create a dampening force;
   an annular member coaxially mounted about said piston rod within said working cylinder;
   said annular member having a flow control means constructed to provide a restricted fluid passage for the controlled flow of hydraulic fluid therethrough;
   said annular member, working cylinder and said end closure defining an annular variable size compression stop chamber above said rebound chamber; and
   said piston rod having means constructed to axially move said annular member within said working cylinder after a predetermined amount of compression stroke of said piston to increase the volume of said compression stop chamber and to provide hydraulic fluid to flow through the flow control means of said annular member to said compression stop chamber to create a dampening force near the compression end of the piston stroke.

2. A shock absorber as defined in claim 1 further characterized by:
   spring means biasing said annular member to a first position; and
   said means constructed to axially move said annular member comprising an butment engageable with said annular member for moving said annular member to a second position such that said annular member is forced to move toward the second position against said bias.

3. A shock absorber as defined in claim 2 further characterized by:
   said annular member being a tubular sleeve with an axial length of over one-half the total travel distance of said piston between its full rebound and full compression positions; and
   said abutment causing said sleeve to move over one-half its axial length against the bias of said spring means.

4. A shock absorber as defined in claim 3 further characterized by:
   an internal rebound bumper coaxially mounted about said piston rod within said working cylinder and extending above said annular member;
   said abutment engageable with said rebound bumper when said piston is in a full rebound position; and
   said bumper being compressible between said abutment and said end closure of said working cylinder.

5. A shock absorber as defined in claim 4 further characterized by:
   said shock absorber incorporated in a suspension strut assembly having an upper mounting assembly; and
   an external jounce bumper coaxially mounted about said piston rod externally of said working cylinder and compressible between said end closure and said mounting assembly of said strut.

6. A shock absorber as defined in claim 4 further characterized by:
   said internal rebound bumper positioned above the upper end of said sleeve;
   said abutment on said piston rod spaced from said piston a distance greater than the axial length of said sleeve; and
   said abutment engageable with a lower end of said sleeve.

7. A shock absorber as defined in claim 3 wherein said spring means comprises:
   a spring seat formed on said annular member;
   a spring seat fixedly mounted on said working cylinder;
   a spring coaxially mounted about said piston rod and seated between said seats; and
   said annular member biased by said spring to said first position.

8. A shock absorber as defined in claim 7 further characterized by:
   said spring seat fixedly mounted on said working cylinder situated below said upper end of said sleeve; and
   said spring being compressed by said abutment and forming a rigid stop for said piston when said spring is fully compressed between said seat on said sleeve and said seat of said working cylinder.

9. A shock absorber as defined in claim 8 wherein:
   said sleeve, said working cylinder, and said spring seat fixedly mounted on said working cylinder forming a variable size spring chamber for housing said spring; and
   said spring chamber has restrictive flow means in communication with one of said rebound chambers and said compression stop chamber.

10. A shock absorber as defined in claim 9 wherein:

said restrictive flow means of said spring chamber is constructed to gradually restrict the flow of liquid therethrough.

11. A shock absorber as defined in claim 10 wherein said restrictive flow means of said spring chamber includes:
said spring seat fixed to said working cylinder being annular in shape with a depending cylindrical wall;
said sleeve having its lower end tapered to fit through said cylindrical wall with an initial clearance;
said sleeve above said tapered end sized such that said sleeve extends through said cylindrical wall forming a restrictive clearance therebetween;
said spring seat on said sleeve forming a restricted clearance with said working cylinder; and
said flow control means of said sleeve in the proximity of said tapered end.

12. A shock absorber as defined in claim 2 further characterized by:
an internal rebound bumper coaxially mounted about said piston rod within said working cylinder and extending above said annular member;
said abutment engageable with said rebound bumper when said piston is in a full rebound position; and
said bumper being compressible between said abutment and said end closure of said working cylinder.

13. A shock absorber as defined in claim 12 wherein said spring means comprises:
said annular member forming a spring seat thereon;
a spring seat fixedly mounted on said working cylinder;
a spring coaxially mounted about said piston rod and seated between said seats; and
said annular member biased by said spring to a first position.

14. A shock absorber as defined in claim 13 further characterized by:
said spring seat fixedly mounted on said working cylinder situated below said upper end of said annular member; and
said spring being compressed by said abutment and forming a rigid stop for said piston when said spring is fully compressed between said seat on said annular member and said seat of said working cylinder.

15. A shock absorber as defined in claim 14 further characterized by:
said shock absorber incorporated in a suspension strut assembly having an upper mounting assembly; and
an external jounce bumper coaxially mounted about said piston rod externally of said working cylinder and compressible between said end closure and said mounting assembly.

16. A shock absorber as defined in claim 2 wherein said spring means comprises:
a spring seat formed on said annular member;
a spring coaxially mounted about said piston rod and seated between said piston rod and seated between said seats; and
said annular member biased by said spring to said first position.

17. A shock absorber as defined in claim 16 further characterized by:
said spring seat fixedly mounted on said working cylinder situated below an upper end of said annular member; and
said spring being compressed by said abutment and forming a rigid stop for said piston when said spring is fully compressed between said seat on said annular member and said seat of said working cylinder.

18. A shock absorber as defined in claim 1 further characterized by:
said shock absorber incorporated in a suspension strut assembly having an upper mounting assembly;
an external jounce bumper coaxially mounted about said piston rod externally of said working cylinder and compressible between said end closure and said mounting assembly.

19. A hydraulic shock absorber characterized by:
a working cylinder;
a piston rod and piston mounted thereon sized to be slideably received within said working cylinder and dividing said cylinder into jounce and rebound chambers with said jounce chamber defined below said piston and said rebound chamber defined above said piston;
said piston having fluid flow control means constructed to provide a restrictive fluid passage for the control of hydraulic fluid from one of said chambers when said piston is moved between said chambers to create a dampening force;
a moveable member mounted above said piston with said moveable member defining, in part, a compression stop chamber;
said moveable member having fluid flow control means constructed to provide a restricted fluid passage for the control of hydraulic fluid therethrough; and
said piston rod having a means constructed to axially move said movable member only after a predetermined amount of compression stroke of said piston to provide hydraulic fluid to flow through the flow control means of said movable member to create dampening force near compression end of the piston stroke.

20. A shock absorber as defined in claim 19 further characterized by:
said movable member defining a border of said compression stop chamber and constructed to increase the size of said compression stop chamber when said movable member is axially displaced from a first position to a second position.

* * * * *